3,417,179
DEVICE FOR GINGIVAL RETRACTION AND
HEMOSTATIC ACTION
Lester Hugh Roth, 3401 5th Ave., Medical Bldg.,
Pittsburgh, Pa. 15213
No Drawing. Filed Dec. 23, 1963, Ser. No. 332,929
1 Claim. (Cl. 424—28)

ABSTRACT OF THE DISCLOSURE

Retraction and hemostasis of gingival tissues are effected with a cotton twine impregnated with 10 to 15 percent by weight of a gel of synthetic calcium hydroxyapatite.

---

This invention relates to means for effecting hemostasis of injured tissue, particularly that encountered with gingival retraction. This has been accomplished heretofore commonly by means of various agents such, for example, as adrenaline and norepinephrine. Disadvantages attend the use of such drugs because they exert definite pressor action and therefore should not be used with persons suffering from vascular conditions. Other agents that have been used to effect gingival retraction are zinc chloride and alum because of their astringent action. These agents, too, are objectionable in that they tend to damage or destroy the gingival tissue and thus to impede or prevent tissue healing.

A primary object of the invention is to provide simple means for exerting hemostatic action upon injured tissue while avoiding undesirable effects of means used previously for that purpose.

It is a special object of the invention to provide means for gingival retraction and hemostasis which avoid the aforementioned disadvantages of previously used agents, which possess definite and highly desirable advantages in comparison with the previous agents, which make use of readily available and inexpensive materials, and which may be sterilized without reduction of their effectiveness.

In accordance with this invention these objects are accomplished by applying to the gingival area or areas an absorbent material, preferably a strand of cotton, impregnated with synthetic calcium hydroxy-apatite

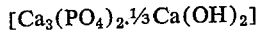

$[Ca_3(PO_4)_2 \cdot \tfrac{1}{3} Ca(OH)_2]$

Most suitably there is used a braided multi-filament cotton twine strand of loose open texture such as that known as parcel post twine.

The synthetic calcium hydroxyapatite is preferably one having the following characteristics: When dried at 100°–110° C., it contains not less than 85% or more than 90% of CaO plus $P_2O_5$ and the weight ratio of CaO to $P_2O_5$ is not less than 1.3:1 or more than 1.4:1. Its solubility in distilled water at 25° C., determined as sulfated ash, is not less than 2 or more than 5 milligrams per 100 cc. of saturated solution. After degassing for 1 hour at 200° C., its total pore volume is not less than 0.35 or more than 0.45 cc./g.; its surface area, as determined by the method of Brunauer, Emmett and Teller, J. Am. Chem. Soc., 60, 309 (1938), is not less than 90 or more than 120 m.²/g., and a curve showing its distribution of pore volume with respect to pore radius, constructed by the method of Barrett, Joyner and Halenda J. Am. Chem. Soc., 73, 373 (1951), exhibits a sharp maximum in the range of 40–60 Angstroms. Ignition of the dry substance at 650° C. for one hour results in the loss of 4 to 6 percent of volatile material, principally water. The dry basis fluoride content (as F) is in the range of 0.05% to 0.1%.

Impregnation of the cotton strand is accomplished preferably by immersing a spool of it in a water slurry of the synthetic calcium hydroxyapatite, suitably a slurry containing about 10 to 15 percent by weight of the hydroxyapatite. If desired, impregnation and thorough distribution may be hastened and made more effective by subjecting the submerged spool to supersonic cavitation. This may be accomplished by subjecting the slurry with the immersed spool for, say, 1 hour to about 800,000 vibrations per second by means known and available. When adequate impregnation has been achieved the spool is withdrawn and dried at, for example, 100° C., following which it is packaged and sterilized in an autoclave at, say, 265° F. and 15 p.s.i. for 30 minutes. The strand is then ready for use in treating gingival tissues. Of course the strand may be impregnated in other ways.

If desired, the hydroxyapatite may be formed within the strand. Thus, a spool of the twine is immersed in a slurry of calcium hydroxide and while stirring vigorously there is added sufficient ortho phosphoric acid to convert the $Ca(OH)_2$ to calcium hydroxyapatite. The acid should be added at a rate such that the solution remains alkaline to litmus paper. The hydroxyapatite deposits as a gel on and through the twine.

A primary advantage of these strands impregnated with calcium hydroxyapatite is that they serve as a carrier for the hydroxyapatite which itself is colloidal, or is converted to a gel, upon contact with injured tissue and acts as a topical hemostat to control coagulation of blood and oozing of fluid from the gum, and thus to promote healing of the tissue. It exerts no vasoconstrictor action. These strands exert no appreciable damage to injured tissues, such as gingival membranes or periodontol attachments, and while they permit displacement of sufficient tissue to allow proper impression they minimize post-operative trauma and pain. The calcium hydroxyapatite impregnated cotton strands of this invention are free from the disadvantages alluded to above of the means previously used for gingival retraction.

Although porous cotton strands as described above suffice for gingival retraction, they may, if desired be used with open pulps, and they may contain from 1 to 5 percent of carboxymethyl cellulose.

The strands provided by the invention are used in the manner in which other gingival retraction media, such as the drugs mentioned above, are applied. Their action is such that they provide a better field in which to work than is ordinarily possible otherwise.

Other absorbent media may be impregnated with this hydroxyapatite to exert hemostatic action upon injured tissue. Thus there may be used purified cellulose, Oxycel, fibrin film or foam, and various other absorbent media.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:
1. Means for gingival retraction and hemostatic ac- tion comprising a sterile braided multi-strand of porous cotton twine impregnated with 10 to 15 percent by weight of a gel of synthetic calcium hydroxyapatite having the following characteristics: when dried at 100°–110° C. it contains not less than 85% or more than 90% of CaO plus $P_2O_5$ and the weight ratio of CaO to $P_2O_5$ is not less than 1.3:1 or more than 1.4:1; its solubility in distilled water at 25° C., determined as sulfated ash, is not less than 2 or more than 5 milligrams per 100 cc. of saturated solution; after degassing for 1 hour at 200° C., its total pore volume is not less than 0.35 or more than 0.45 cc./g.; its surface area is not less than 90 or more than 120 m.²/g., and a curve showing its distribution of pore volume with respect to pore radius exhibits a sharp maximum in the range of 40–60 Angstroms; ignition of the dry substance at 650° C. for one hour results in the loss of 4 to 6 percent of volatile material, principally water; and the dry basis fluoride content (as F) is in the range of 0.05% to 0.1%.

References Cited

UNITED STATES PATENTS 1,839,486    1/1932    Lawton _____ 167—60 X

RICHARD L. HUFF, *Primary Examiner.*

U.S. Cl. X.R.

424—128